United States Patent [19]

Mims

[11] Patent Number: 4,529,473
[45] Date of Patent: Jul. 16, 1985

[54] ULTRASONIC WELDING APPARATUS

[75] Inventor: Bruce L. Mims, Fairfield, Conn.

[73] Assignee: Branson Ultrasonics Corporation, Newtown, Conn.

[21] Appl. No.: 505,931

[22] Filed: Jun. 20, 1983

[51] Int. Cl.³ .................. B29C 27/08; B65B 51/22
[52] U.S. Cl. .................. 156/580.2; 53/479; 156/73.1; 228/1 R; 228/1.1; 264/23; 425/174.2
[58] Field of Search .............. 156/73.1, 73.2, 73.4, 156/580.1, 580.2, 158; 264/23; 425/174.2; 53/479; 228/1 R; 100/233, 245; 384/276, 281, 282, 295, 297, 299, 300

[56] References Cited

U.S. PATENT DOCUMENTS

| | | | |
|---|---|---|---|
| 2,675,276 | 4/1954 | Daugherty | 384/297 |
| 3,008,779 | 11/1961 | Spriggs | 384/299 |
| 3,184,354 | 5/1965 | Strother | 156/73.2 |
| 3,386,870 | 6/1968 | Morin | 156/580.2 |
| 3,518,920 | 7/1970 | Bimba | 384/300 |
| 3,763,769 | 10/1973 | Bysouth et al. | 100/245 |
| 4,075,046 | 2/1978 | MacDonald | 156/73.1 |
| 4,190,690 | 2/1980 | Rabeneck et al. | 156/73.2 |

Primary Examiner—Michael Wityshyn
Attorney, Agent, or Firm—Ervin B. Steinberg; Philip J. Feig

[57] ABSTRACT

An ultrasonic welding apparatus for providing a closure on plastic film bags wherein the end of the film bags is gathered, twisted or not twisted, and then welded to provide a hermetic seal, includes an anvil having a recess into which the gathered plastic material is placed for welding. The side of the recess is lined with low friction material, such as nylon or Teflon, to accomodate a sliding fit between the resonator and the anvil recess. Absent a close fit between the anvil side surface and the resonator side surface, bag material will escape into such space, thereby preventing a hermetic seal. The low friction material prevents destruction of the opposing surfaces subjected to high intensity vibrational forces.

6 Claims, 3 Drawing Figures

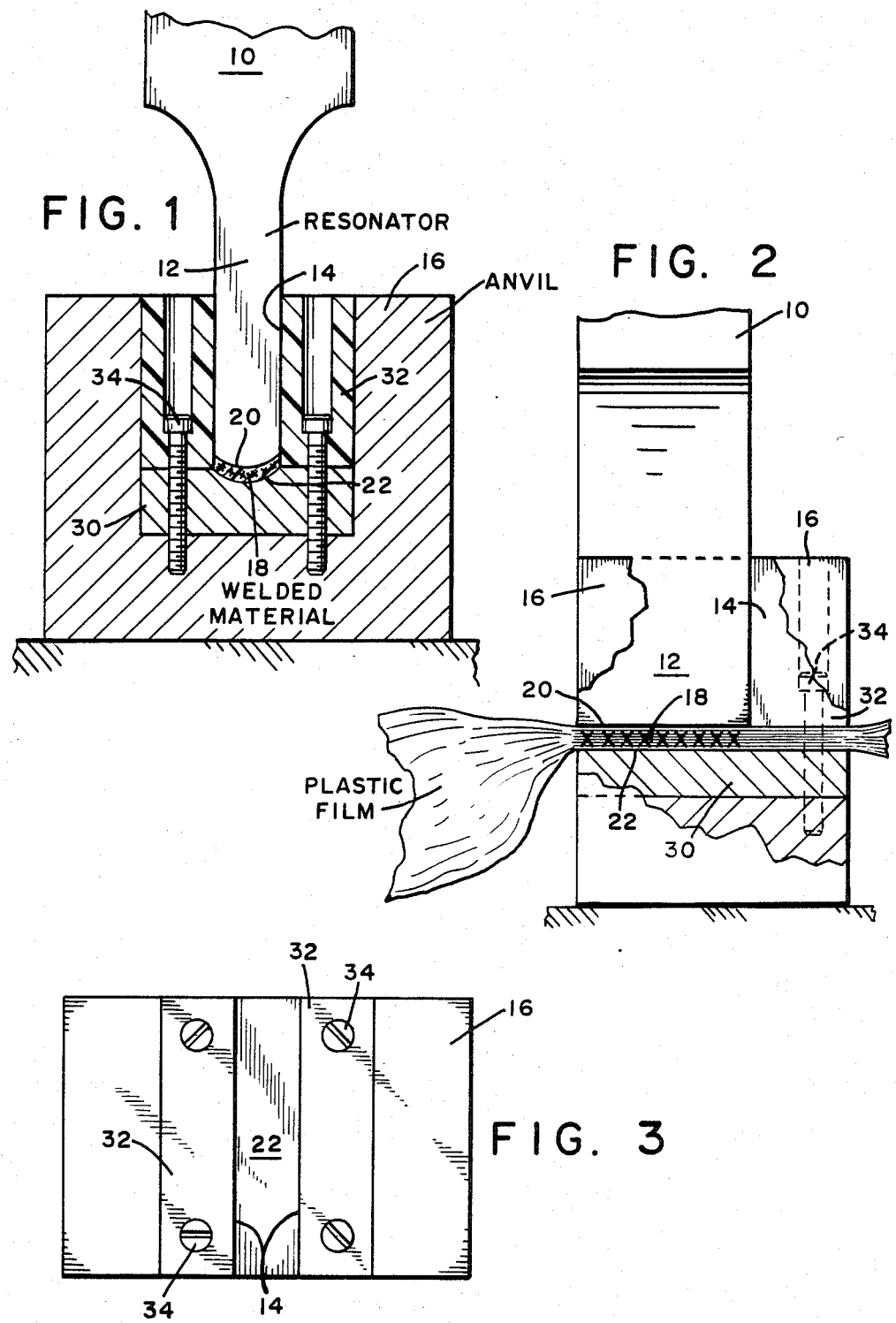

ULTRASONIC WELDING APPARATUS

BACKGROUND OF THE INVENTION

This invention refers to an ultrasonic welding apparatus and more particularly to an apparatus for sealing plastic film bags. Quite specifically, this invention concerns an ultrasonic welding apparatus for sealing plastic film bags wherein the open end of the bags is gathered, possibly twisted, and then sealed by providing a weld. Bags of this type are used primarily for packaging irregularly shaped articles, such as meat, fresh produce, etc.

The process and apparatus for closing plastic film packages or bags of the type indicated is known in the prior art, see, for instance, U.S. Pat. No. 3,667,594 issued to A. D. Herrell, dated June 6, 1972, entitled "Closure for Film Packages and Method of Making Same", and U.S. Pat. No. 3,780,488, issued to A. D. Herrell, dated Dec. 25, 1973 entitled "Closure for Film Packages and Method of Making Same". A similar method and apparatus for ultrasonically sealing thermoplastic net bags is shown in U.S. Pat. No. 4,190,690, issued to K. Rabeneck et al, dated Feb. 26, 1980 entitled "Manufacture of Sealed-End Tubular Thermoplastic Net Bagging", and in U.S. Pat. No. 4,289,569 dated Sept. 15, 1981 issued to the same inventors.

Ultrasonic sealing of bags and netting as shown in these prior art devices have not been entirely satisfactory, thereby impeding wide-spread commercial use of this method of bag sealing.

The present invention concerns an improved arrangement and particularly reveals an improved anvil structure for the ultrasonic sealing apparatus. Specifically, this invention discloses an anvil construction in which the anvil has a recess into which the gathered bag closure material is inserted for welding. The ultrasonic resonator, or horn, is shaped to enter the recess of the anvil to provide ultrasonic energy to the gathered closure material. The specific improvement disclosed herein concerns the provision of a sliding fit between the resonator portion entering the anvil recess and the anvil recess in order to prevent the extrusion of plastic film material into the side or wall space between the resonator and the anvil. Such extrusion or escapement of film material interferes with the provision of a hermetic seal. In order to avoid the destruction of the resonator surface and the anvil surfaces, which are in sliding contact with each other, the anvil surfaces facing the resonator are lined with a low friction material.

One of the principal objects of this invention, therefore, is the provision of a new and improved ultrasonic welding apparatus.

Another and important object of this invention is the provision of an improved ultrasonic welding apparatus for providing a closure on film bag material, wherein the closure is provided by gathering the bag material and welding the gathered material to cause a welded nugget.

Another important object of this invention is the provision of an ultrasonic welding apparatus for providing a closure on thin film bag material wherein the closure end comprises gathered film material which is adapted to be confined in the recess of an anvil during the welding process.

A still further and other object of this invention is the provision of an ultrasonic welding apparatus having an anvil which exhibits a recess lined with low friction material.

Further and still other objects of this invention will become more clearly apparent by reference to the following description when taken in conjunction with the accompanying drawings.

BRIEF DESCRIPTION OF THE DRAWINGS

FIG. 1 is an elevational view, partly in section, of the ultrasonic welding apparatus according to the present invention;

FIG. 2 is a side view of the embodiment per FIG. 1, and

FIG. 3 is a top plan view of the anvil.

DETAILED DESCRIPTION OF THE INVENTION

Referring now to the figures, numeral 10 identifies a solid resonator, also called horn, concentrator, mechanical amplifier, or tool, which is dimensioned to be resonant along its longitudinal axis at a predetermined frequency of vibration, such as 20 kHz. The resonator, when energized at its input surface (not shown) from an ultrasonic converter unit, provides ultrasonic energy (vibrations) at its opposite output end to a workpiece which is in forced contact with such output end. Resonators of this type are well known in the art and are described in detail, for instance, in the book "Ultrasonic Engineering", by Julian R. Frederick, John Wiley & Sons, Inc., New York (1965), pages 87 to 103. The present resonator is of rectangular cross section, known as bar horn, and includes a reduced cross sectional output portion 12 for providing vibrations of increased motional amplitude to a workpiece. A typical vibrational output is 0.05 mm peak to peak excursion at 20 kHz. The output portion 12 of the resonator is adapted to enter the rectangularly shaped recess 14 of an anvil 16 which is supported on a rigid plate (not shown). Closure material to be welded, that is, plastic film 18 which has been gathered, twisted or not twisted, is confined at the bottom of the anvil recess between the output surface 20 of the resonator and the bottom surface 22 of the slotted recess, and is welded into a solid nugget responsive to the resonator briefly being rendered resonant and in forced contact with the mass 18 of closure material. After the weld has been achieved, the resonator is withdrawn from the slotted recess of the anvil and the sealed closure is removed.

Constructions in which the resonator enters the recess of an anvil have been disclosed in the prior art, see for instance, U.S. Pat. No. 3,184,354 issued to F. P. Strother dated May 18, 1965 entitled "Method of Splicing Multifilament Yarns by Vibratory Treatment", or U.S. Pat. No. 3,386,870 issued to L. H. Morin, dated June 4, 1968 entitled "Method of Ultrasonic Bonding of Overlying Portions of a Fishhook Snell".

In the present apparatus, designed particularly for welding the closure of thermoplastic film bag material, unique conditions are present. In order to prevent the very thin film material from extruding or escaping into the side space between the ultrasonic resonator and the anvil recess, thereby precluding the forming of a hermetic seal, the output portion 12 of the resonator and the recess of the anvil are dimensioned to provide with each other a sliding fit to cause a minimum of open space. In view of the extremely high vibratory forces present at the output portion of the resonator when the resonator is rendered resonant, i.e. antinode of longitudinal vibration, and keeping in mind that the resonator and the anvil usually are made of metal, there would be a very fast destruction of the surfaces subjected to very high intensity rubbing contact. In the present invention, the side walls of the anvil 16 are provided with a lining of low friction material, typically a thermoplastic synthetic resin material, such as nylon or Teflon. An advantage of this type of material resides in the fact that the resonator side surfaces can be in sliding contact with the anvil and in the event of actual interference, the anvil lining material will soften and melt at its surface, thereby relieving the interference. However when the resonator no longer is subjected to vibration or is withdrawn, a self healing effect occurs.

As shown in the figures, the anvil includes a metallic bottom plate 30, made for instance of aluminum or copper to provide good thermal conduction, and a pair of side or wall plates 32 made of thermoplastic material, held in the anvil 16 by suitable screws 34. The plates 32 can readily be replaced, if worn, or changed in shape to suit other workpieces. By virtue of the sliding fit between the rectangularly shaped resonator and the anvil lining, the extrusion of plastic workpiece film material into the lateral space between the resonator and anvil recess is minimized, if not excluded.

In order to increase the quality of the welded nugget, the frontal surface 20 of the resonator and/or the opposing surface 22 of the bottom plate 32 may be provided with ridges, knurles, grooves, etc. as known in the art. Also, while the resonator frontal surface 20 and the opposing bottom plate surface 22 are shown curved, they may be flat or shaped otherwise to suit conditions.

It will be apparent that the horn output portion and the anvil recess need not to be of rectangular cross section, but that other cross sectional shapes can be used, such as wedge shaped, cylindrical with entrance and exit slots for the film material, etc.

While there has been described and illustrated a preferred embodiment of the invention, it will be apparent to those skilled in the art that certain modifications and changes may be made without deviating from the principle of the invention which shall be limited only by the scope of the appended claims.

What is claimed is:

1. An ultrasonic welding apparatus adapted to operate at a predetermined frequency of at least 20 kHz including an elongated solid resonator dimensioned to be resonant as a half wavelength resonator for ultrasonic energy of said predetermined frequency transmitted longitudinally therethrough from an input surface to an oppositely disposed output surface, such energy being applied by said resonator to a thermoplastic workpiece in forced contact with said output surface of said resonator, and an anvil having a recess into which said output surface and the adjacent output portion of said resonator are adapted to enter for welding when resonant a workpiece disposed in said anvil recess, the improvement comprising:

said output portion of said resonator and said recess being dimensioned to exhibit substantially a sliding fit between the side surface of said recess and the side surface of said output portion of said resonator for preventing the accumulation of workpiece material between the side surfaces of said recess and said output portion of said resonator during the welding of the thermoplastic workpiece, and said side surface of said recess being made of (low friction) thermoplastic synthetic resin material.

2. An ultrasonic welding apparatus as set forth in claim 1, said synthetic resin material being Teflon.

3. An ultrasonic welding apparatus as set forth in claim 1, said synthetic resin material being nylon.

4. An ultrasonic welding apparatus as set forth in claim 1, said recess being in the shape of a slot.

5. An ultrasonic welding apparatus as set forth in claim 1, said side surface being removably disposed in said anvil.

6. An ultrasonic welding apparatus as set forth in claim 5, said recess having a bottom surface made of metallic material.

* * * * *